United States Patent
Loui et al.

(10) Patent No.: US 12,061,249 B1
(45) Date of Patent: Aug. 13, 2024

(54) RADAR TRANSMIT BANDWIDTH AUGMENTATION

(71) Applicant: National Technology & Engineering Solutions of Sandia, LLC, Albuquerque, NM (US)

(72) Inventors: Hung Loui, Albuquerque, NM (US); Brianna N. Maio, Albuquerque, NM (US); Steven Castillo, Peralta, NM (US); Emmett J. Gurule, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 428 days.

(21) Appl. No.: 17/522,385

(22) Filed: Nov. 9, 2021

(51) Int. Cl.
   *G01S 13/02* (2006.01)
   *G01S 7/03* (2006.01)

(52) U.S. Cl.
   CPC .......... *G01S 13/0209* (2013.01); *G01S 7/038* (2013.01)

(58) Field of Classification Search
   CPC ... G01S 7/35; G01S 7/035; G01S 7/32; G01S 7/032; G01S 7/38; G01S 7/038; G01S 7/40; G01S 7/04; G01S 7/23; G01S 7/023; G01S 2013/0245; G01S 2013/0254; G01S 13/0209; H04B 1/0475; H04B 1/719
   USPC ........................... 342/100, 175, 173, 21, 174
   See application file for complete search history.

(56) References Cited

U.S. PATENT DOCUMENTS

| | | | |
|---|---|---|---|
| 5,999,573 A | 12/1999 | Zangi | |
| 6,898,235 B1 | 5/2005 | Carlin et al. | |
| 6,901,112 B2 | 5/2005 | McCorkle et al. | |
| 7,206,334 B2 | 4/2007 | Siwiak | |
| 7,206,557 B2 | 4/2007 | Aytur et al. | |
| 7,253,761 B1 | 8/2007 | Hoyos et al. | |
| 7,340,009 B2 | 3/2008 | Giannakis et al. | |
| 7,436,912 B2 | 10/2008 | Fudge et al. | |
| 7,450,051 B1 * | 11/2008 | Valentine | H03D 7/1408 342/115 |
| 7,579,976 B1 * | 8/2009 | Valentine | H03D 7/1408 342/99 |
| 8,520,767 B2 * | 8/2013 | Omoto | H04L 27/2032 370/278 |
| 8,559,549 B2 * | 10/2013 | Aoyagi | G01S 7/282 341/20 |
| 9,322,918 B2 * | 4/2016 | Vollath | G01S 19/04 |
| 9,344,130 B2 * | 5/2016 | Nentwig | H03D 3/008 |
| 9,356,632 B2 * | 5/2016 | Weissman | H04B 1/0483 |
| 9,450,537 B2 | 9/2016 | Tham et al. | |

(Continued)

*Primary Examiner* — Ladimir Magloire
*Assistant Examiner* — Michael W Justice
(74) *Attorney, Agent, or Firm* — Mark A. Dodd

(57) ABSTRACT

Various technologies pertaining to forming a very high instantaneous bandwidth (IBW) radar signal based upon several radio frequency (RF) signals that have sub-bands of the frequency band of the radar signal are described herein. A radar system is configured to address local oscillator leakage across multiple transmit channels of the radar system, such that the radar signal has a relatively constant or other desired amplitude and phase across frequencies of the radar signal. In addition, the radar system is configured to compute a correction signal that pre-distorts each of the sub-frequency channels such that upon combining enables the generation of desired amplitude and phase response across a transmitted pulse.

14 Claims, 13 Drawing Sheets

(56) References Cited

U.S. PATENT DOCUMENTS

| | | | |
|---|---|---|---|
| 10,305,199 B2 | 5/2019 | Corman et al. | |
| 10,382,087 B1* | 8/2019 | Dror | H04B 1/525 |
| 10,615,495 B1 | 4/2020 | Loui | |
| 10,651,527 B2 | 5/2020 | Mohan | |
| 10,756,417 B2* | 8/2020 | Izadian | G01S 13/931 |
| 10,788,568 B1 | 9/2020 | Loui et al. | |
| 10,921,434 B2* | 2/2021 | Guarin Aristizabal | G01S 13/88 |
| 11,101,831 B2* | 8/2021 | Dao | H04B 7/06 |
| 11,316,482 B2* | 4/2022 | Panseri | H03F 1/3241 |
| 11,397,239 B2* | 7/2022 | Jungmaier | G01S 7/282 |
| 11,460,542 B2* | 10/2022 | Doare | G01S 7/40 |
| 2008/0260019 A1* | 10/2008 | Aoyagi | G01S 7/006 |
| | | | 332/108 |
| 2011/0285587 A1* | 11/2011 | Vollath | G01S 19/071 |
| | | | 342/357.62 |
| 2012/0189081 A1* | 7/2012 | Omoto | H04L 27/36 |
| | | | 375/298 |
| 2014/0171008 A1* | 6/2014 | Nentwig | H03D 7/1458 |
| | | | 455/323 |
| 2015/0117334 A1 | 4/2015 | Rabe et al. | |
| 2016/0099733 A1* | 4/2016 | Weissman | H03F 1/3223 |
| | | | 455/114.2 |
| 2019/0018127 A1* | 1/2019 | Guarin Aristizabal | G01S 13/88 |
| 2019/0190133 A1* | 6/2019 | Izadian | H01Q 13/20 |
| 2020/0158821 A1* | 5/2020 | Doare | H04B 17/12 |
| 2021/0050874 A1* | 2/2021 | Dao | H04B 17/14 |
| 2023/0421199 A1* | 12/2023 | Reggiannini | H04B 1/525 |

\* cited by examiner

RADAR TRANSMIT BANDWIDTH AUGMENTATION

STATEMENT OF GOVERNMENT INTEREST

This invention was made with Government support under Contract No. DE-NA0003525 awarded by the United States Department of Energy/National Nuclear Security Administration. The Government has certain rights in the invention.

BACKGROUND

Radar systems are used in a variety of applications, including imaging, weather, autonomous vehicle (AV) navigation, etc. Generally, a radar system transmits a radio signal, which results in emission of electromagnetic (EM) radiation having frequencies within a frequency band. At least a portion of the radar signal reflects off a surface and/or targets, and the reflected (echo) signal is detected by the radar system. Processing circuitry in the radar system generates data pertaining to the surface and/or targets based upon the echo signal.

In one example application, a synthetic aperture radar (SAR) system is placed upon an airborne vehicle and used to generate images of the Earth as the airborne vehicle travels. In another example application, a radar system is employed in connection with detecting objects in a scene. In a nonlimiting example, an AV is equipped with a radar system, and the radar system is utilized in connection with detecting objects in an environment of the AV, such that the AV is able to autonomously navigate about roadways in a region based upon the detected objects. In operation, the radar system emits EM radiation having frequencies within a predefined frequency band, and at least some of such EM radiation reflects off an object in the scene. The radar system detects the reflected EM radiation and generates data about the object based upon the reflected EM radiation. The data about the object can include size of the object, range of the object relative to the radar system, velocity of the object relative to the radar system, and direction of the object relative to the radar system.

Resolution of images and/or other data generated by a radar system is dependent upon the instantaneous bandwidth (IBW) of radar signals emitted by the radar system, where the resolution increases as the IBW increases. IBW of an emitted radar signal, however, is limited by conventional hardware employed in radar systems. For instance, a conventional radar system includes a digital signal generator that generates a digital signal. A digital-to-analog converter (DAC) is configured to receive the digital signal and convert the digital signal to an analog signal. IBW and quality of the resulting analog signal is limited by, for instance, the sampling rate and resolution of the DAC, respectively. Obtaining a high-resolution DAC that has a very high sampling rate is costly, making such DAC unsuitable for use in commercial radar systems. Typically, the higher the sampling rate of an expensive DAC the lower its resolution.

SUMMARY

The following is a brief summary of subject matter that is described in greater detail herein. This summary is not intended to be limiting as to the scope of the claims.

Described herein are various technologies that pertain to increasing bandwidth of radar signals emitted by a radar system, where multiple analog signals output by multiple lower sampling rate (e.g., a few gigasamples per second) digital-to-analog converters (DACs) can be utilized to generate a radar signal with a very high instantaneous bandwidth IBW (e.g., a broadband radar signal). Utilizing such technologies, a radar system is able to generate data with higher resolution compared to what is possible with conventional radar systems. There are several different approaches described herein that can be employed in connection with a radar system generating a very high IBW radar signal. These different approaches can be utilized individually or in combination in a radar system in connection with configuring the radar system to generate a very high IBW radar signal.

A radar system described herein includes several transmit channels. Each transmit channel in the several transmit channels includes an intermediate frequency (IF) digital signal generator, a DAC that is operably coupled to the IF digital signal generator, and a mixer that is operably coupled to the DAC. Henceforward, the use of the term IF includes the special case of zero-IF or complex baseband operation where the use of quadrature mixer and dual-channel in-phase quadrature (I/Q) DAC is implied for such a case. In operation, the DAC receives a digital IF signal that is generated by the IF digital signal generator. The DAC converts the IF digital signal to an IF analog signal, where the IF analog signal has a frequency band. The mixer receives the IF analog signal and mixes the IF analog signal with a local oscillator (LO), thereby upconverting the IF analog signal to a radio frequency (RF) analog signal that has a higher frequency center than the IF analog signal. LOs in two different transmit channels are selected such that RF analog signals output by two mixers in two transmit channels of the radar system have respective frequency bands that are extensions of one another, such that the frequency bands are adjacent to one another or partially overlapping with one another. Theoretically, then, these two RF analog signals can be combined to create a combined (very high IBW) RF signal that has up to twice the instantaneous bandwidth of the individual RF signals. It has been observed, however, that the LOs leak across the transmit channels of the radar system, such that when multiple RF analog signals generated in different transmit channels are combined, the combined RF signal does not have a desired (e.g., relatively constant) amplitude and phase across frequencies of the combined RF signal and the combined RF signal includes amplitude spikes at frequencies corresponding to the LOs.

The technologies described herein relate to addressing the LO leakage across transmit channels of the radar system such that the combined RF signal has a relatively constant or other desired amplitudes across frequencies in the frequency band of the combined RF signal. In an example, the desired amplitude and phase may be non-constant and non-linear, respectively, such as to address distortions introduced by downstream componentry in the transmit path, such that output of the antenna is a pulse with a relatively constant amplitude and linear phase. The technologies described herein also relate to pre-distorting Tx waveforms when frequency bands of two transmit channels partially overlap.

In a first example approach, LO leakage across the entire system is measured, and the measured LO leakage for the system is employed to pre-distort the digital IF signals output by the IF digital signal generators. With more specificity, based upon the system LO leakage, phases of digital signals emitted by IF digital signal generators are sequentially adjusted over different transmit channels until the system LO leakage is minimized. The adjusted phase shifts are employed to pre-distort the digital IF signals output by the IF digital signal generators during operation of the radar system.

In a second example approach, feedforward loops are introduced into each transmit channel of the radar system, where the LO of each transmit channel is fed forward to the output of the transmit channel. Each feed forward loop includes at least one attenuator and at least one phase shifter, and during operation of the radar system, a LO of the transmit channel is attenuated and phase shifted by the at least one attenuator and the at least one phase shifter. With more particularity, the system LO leakage is measured. Further, leakage of a (disconnected) feed forward loop is measured. The amplitude of the LO in the feed forward loop is adjusted until a coupling factor of the feed forward loop is above the system LO leakage. Thereafter, the feed forward loop is connected to the output of the transmit channel, and phase of the LO in the feed forward loop is adjusted until the system LO leakage is minimized. This process can be repeated for each transmit channel until the overall system LO leakage is minimized. Subsequent to the feed forward loops being connected in the radar system, the transmit channels generate analog RF signals that, when combined, form a combined RF signal with relatively constant or other desired amplitude across multiple RF frequency bands of the individual transmit channels.

In another example approach, LO leakage is addressed by selecting LOs such that two RF frequency bands associated with two transmit channels are adjacent, but the LOs fail to interfere with such frequency bands. More specifically, when an LO is employed to upconvert an analog IF signal, two RF signals having two different frequency bands on either side (in frequency) of the LO are formed. Therefore, a first LO and a second LO can be selected, where a first frequency band of a first RF signal on one side of the first LO is adjacent to a second frequency band of a second RF band on the other side of the second LO. In yet another example, in-phase or quadrature (IQ) mixing is employed to create a combined RF signal that has relatively constant amplitude and phase across frequencies associated with multiple transmit channels. Further, as indicated above, such approaches can be combined in order to create a combined RF signal with a relatively constant or other desired amplitude and phase across multiple RF frequency bands associated with different transmit channels of the radar system.

Once LO leakage (if any) is addressed, transmit waveforms emitted by numerous transmit channels are pre-distorted to cause amplitude and phase of the output very high IBW signal to be relatively constant across a chirp (or, in another example, to cause the amplitude and phase of the output very high IBW signal to be as desired at any given frequency within the frequency band). An output signal generated based upon a combination of output signals from the transmit channels is measured and compared with an ideal output signal. Based upon such comparison, a correction signal is computed, and the correction signal is employed in the transmit channels to compensate for transmit signals having overlapping frequencies.

An advantage of the technologies described herein is that multiple, relatively inexpensive high-resolution DACs can be employed in a radar system, and the radar system can be configured to generate a high-resolution, very high IBW radar signal. Based upon the very high IBW radar signal, the radar system can generate data with higher range resolution compared to results that can be generated by conventional radar systems.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
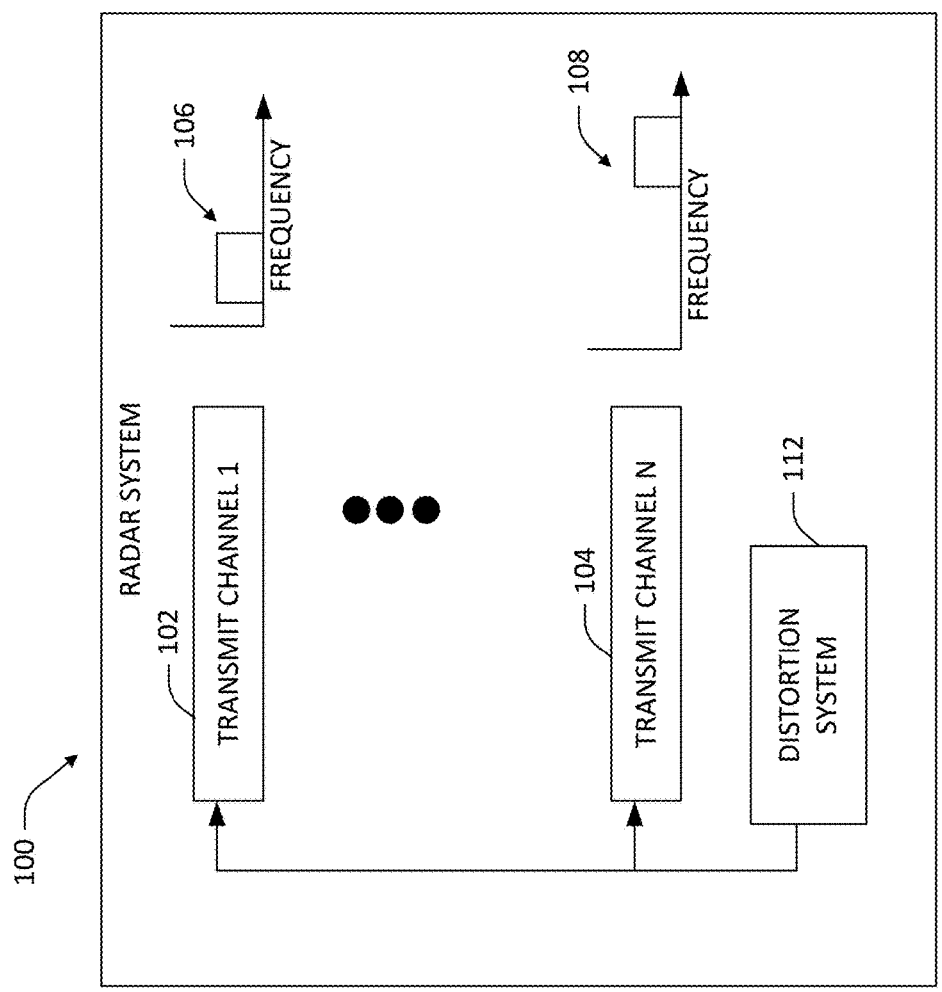
FIG. 1 is a functional block diagram of a radar system, where multiple radio frequency (RF) signals generated by multiple transmit channels in the radar system are combined to form a very high instantaneous bandwidth (IBW) RF signal.

Various technologies pertaining to forming a very high instantaneous bandwidth (IBW) radio frequency (RF) signal for transmission by a radar system are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something and is not intended to indicate a preference.

Described herein are various technologies pertaining to a radar system that are configured to emit a very high IBW RF signal based upon multiple RF signals generated in multiple transmit channels of the radar system. For instance, the very high IBW RF signal can be greater than 1 GHz, such as between 1 GHz and 3 GHz. In another example, the very high IBW RF signal can be greater than 10 GHz, such as between 10 GHz and 15 GHz. Other ranges are also contemplated. Each transmit channel of the radar system is assigned an RF frequency band, where the RF frequency bands assigned to the transmit channels are adjacent to or partially overlapping with one another. The technologies described herein allow for RF signals generated in the numerous transmit channels to be combined to form a very high IBW RF signal that has a relatively constant or other desired amplitude and phase across frequencies of the RF signal. An advantage of the technologies described herein over conventional radar systems is that relatively inexpensive radar componentry (e.g., digital-to-analog converters (DACs)) can be employed in connection with generating high-resolution RF signals that are emitted by the radar system. Thus, a radar system described herein can include relatively inexpensive commercial-off-the-shelf (COTS) radar componentry, yet the radar system can nevertheless emit a RF signal having a very high IBW. Moreover, the radar system can generate relatively high-resolution data based upon the emitted very high IBW RF signal.

With reference now to FIG. 1, a functional block diagram of a radar system 100 is illustrated. The radar system 100 includes several transmit channels 102-104. As will be described in greater detail herein, each of the transmit channels 102-104 can include an intermediate frequency (IF) digital signal generator, a DAC that is operably coupled to the IF digital signal generator, and a mixer that is operably coupled to the DAC. The IF digital signal generator is configured to generate a digital signal having an IF frequency band. The DAC receives the digital signal and converts the digital signal into an analog signal having the IF frequency band. The mixer receives the IF analog signal and mixes the IF analog signal with a local oscillator (LO), thereby upconverting the IF analog signal to an RF analog signal. Each transmit channel can further include a filter for filtering the image of the up converted RF signal, one or more amplifiers, and/or other componentry used in radar systems.

Therefore, the transmit channels 102-104 of the radar system 100 respectively generate RF signals 106-108 that correspond to respective frequency bands. As illustrated in FIG. 1, the first transmit channel 102 generates the first RF signal 106 having a first frequency band while the Nth transmit channel 104 generates an Nth RF signal 108 having an Nth frequency band, where frequency bands of the N RF signals 106-108 are adjacent to one another or partially overlapping.

The radar system 100 is configured to generate a combined (very high IBW) RF signal 110, where the combined RF signal 110 has a frequency band that spans the frequency bands of the RF signals 106-108. In the example where N=2, the IBW of the combined RF signal 110 can be up to the bandwidth of the first RF signal 106 plus the bandwidth of the Nth RF signal 108. As will be described in greater detail herein, LO leakage across the transmit channels 102-104 of the radar system 100 is accounted for, such that the combined RF signal 110 has a relatively constant (or other desired) amplitude and desired phase across the frequency band of the combined RF signal 110. If LO leakage is not addressed, the combined RF signal 110 will have amplitude spikes corresponding to one or more LOs mixed with analog IF signals in the transmit channels 102-104 of the radar system 100.

The radar system 100 includes a distortion system 112 that is configured to address LO leakage across the transmit channels 102-104 of the radar system 100. The distortion system 112 is configured to introduce distortions into digital IF signals and/or the RF signals 106-108 such that when the RF signals 106-108 are combined to form the combined RF signal 110, the combined RF signal 110 has relatively constant or other desired amplitude and phase across the frequency band of the combined RF signal 110.

The distortion system 112 can introduce different types of distortions into digital IF signals and/or analog RF signals to address LO leakage. In addition, the distortion system 112 can pre-distort transmit signals generated in the transmit channels to address distortion in the resultant output signal caused by overlapping signals in the transmit signals. In a first example, the distortion system 112 distorts IF digital signals generated by the IF digital signal generators in the transmit channels 102-104, such that when the RF signals 106-108 are combined to form the combined RF signal 110, LO leakage is addressed and the combined RF signal 110 has a relatively constant or other desired amplitude and phase across the frequency band of the combined RF signal 110. In another example, the distortion system 112 can take the form of feed forward loops, where LOs in the transmit channels 102-104 are fed forward, attenuated, and phase-shifted such that when the attenuated, phase-shifted LOs are combined with the RF signals output by the mixers of the transmit channels 102-104, LO leakage introduced into the RF signals 106-108 is at least partially cancelled. In yet another example, the distortion system 112 can take the form of filters, where LO frequencies are selected to preclude LO leakage between transmit channels, and further where the filters are configured to filter out mirror image signals on opposing sides of LOs in frequency, such that what remains is the combined RF signal 110. In yet another example, the distortion system 112 can take the form of an in-phase and quadrature (IQ) mixer. Again, the result is the combined RF signal 110, which is based upon numerous RF signals 106-108 generated in numerous transmit channels 102-104 of the radar system 100, such that the radar system 100 is configured to output a very high IBW RF signal.

Figure 2:
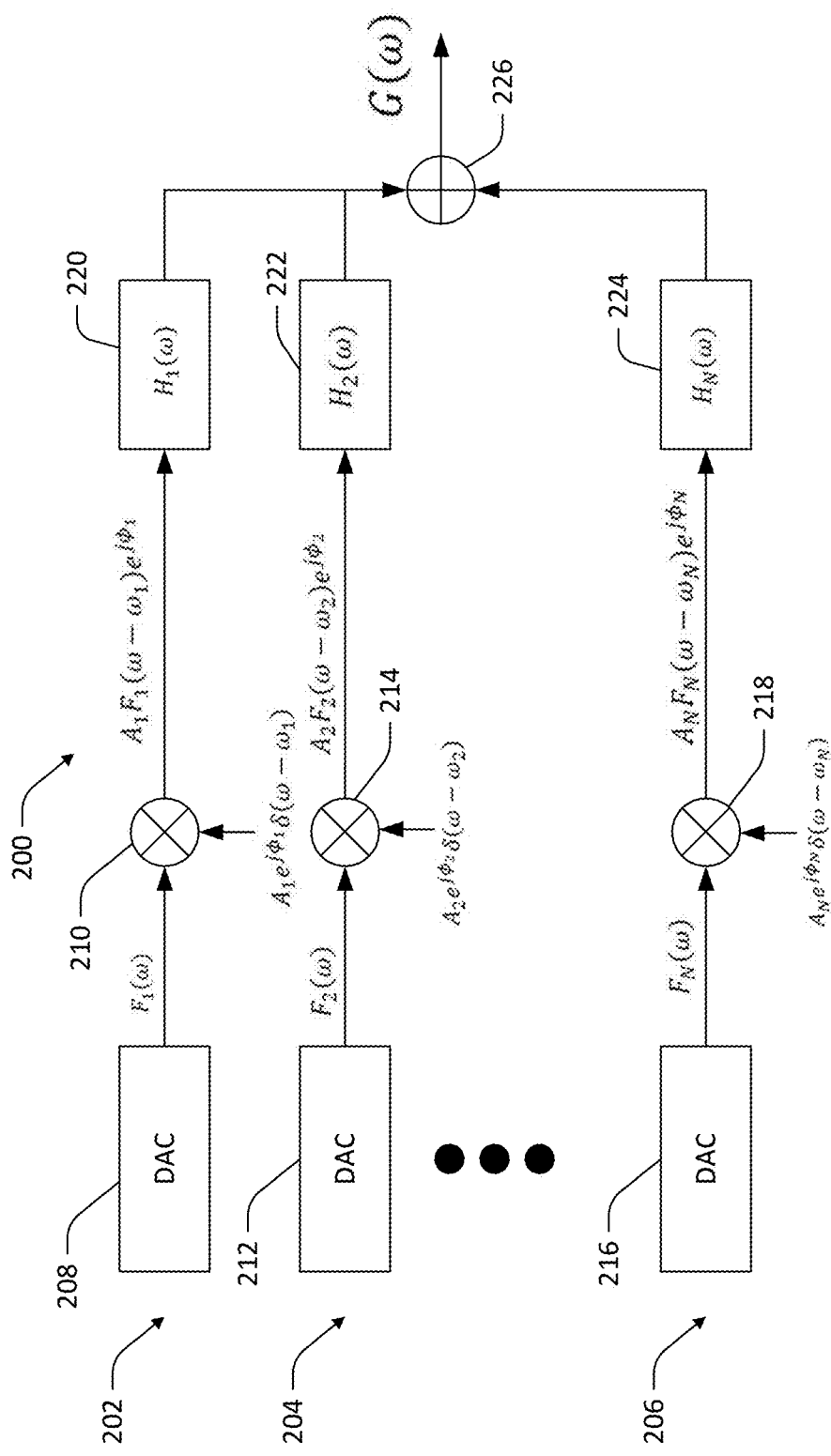
FIG. 2 is a schematic that depicts transmit channels of a radar system.

Referring now to FIG. 2, a schematic that depicts portions of several transmit channels 200 of the radar system 100 is depicted. The schematic 200 illustrates that the radar system 100 includes N transmit channels 202, 204, and 206. The first transmit channel 202 includes a first DAC 208 and a first mixer 210 that is operably coupled to the first DAC 208. The second transmit channel 204 includes a second DAC 212 and a second mixer 214 that is operably coupled to the second DAC 212. The Nth transmit channel 206 includes an Nth DAC 216 and an Nth mixer 218 that is operably coupled to the Nth DAC 216. Each of the transmit channels 202-206 has a respective channel response; therefore, the first transmit channel 202 has a first channel response 220, the second transmit channel 204 has a second channel response 222, and the Nth transmit channel 206 has an Nth channel response 224. The schematic 200 further indicates that a combiner 226 combines outputs of the transmit channels 202-206.

In operation, the DACs 208, 212, and 216 output analog IF signals. Referring to the first transmit channel 202, the first DAC 208 outputs a first analog IF signal $F_1(\omega)$, the first mixer 210 mixes the first IF analog signal with a local oscillator $A_1 e^{j\Phi_1} \delta(\omega - \Phi_1)$, thereby upconverting the first analog IF signal to a first analog RF signal $A_1 F_1(\omega - \Phi_1) e^{j\Phi_1}$. Each of the analog RF signals generated by the transmit channels 202-206 are modified by their respective channel responses 220-224, and the resulting signals are combined by the combiner 226 to form a combined RF signal $G(\omega)$.

Given the above mathematical description, the goal is to include a correction function $C(\omega)$, such that $C(\omega)G(\omega) = \text{Ideal}(\omega)$:

$$\text{Ideal}(\omega) = G(\omega)C(\omega) = \sum_{n=1}^{N} A_n e^{j\phi_n} F_n(\omega - \omega_n) C(\omega) H_n(\omega). \quad \text{(Eq. 1)}$$

The distorted signal functions can be defined as:

$$M_n(\omega - \omega_n) = F_n(\omega - \omega_n) C(\omega). \quad \text{(Eq. 2)}$$

When the expression is shifted to IF, the following is obtained:

$$M_n(\omega) = F_n(\omega) C(\omega + \omega_n). \quad \text{(Eq. 3)}$$

Therefore, the distorted signal $M_n(\omega)$ at IF is the same as $F_n(\omega)$ multiplied by $C(\omega)$ at RF shifted to IF. An example of a correction signal ('(w) is set forth herein.

Figure 3:
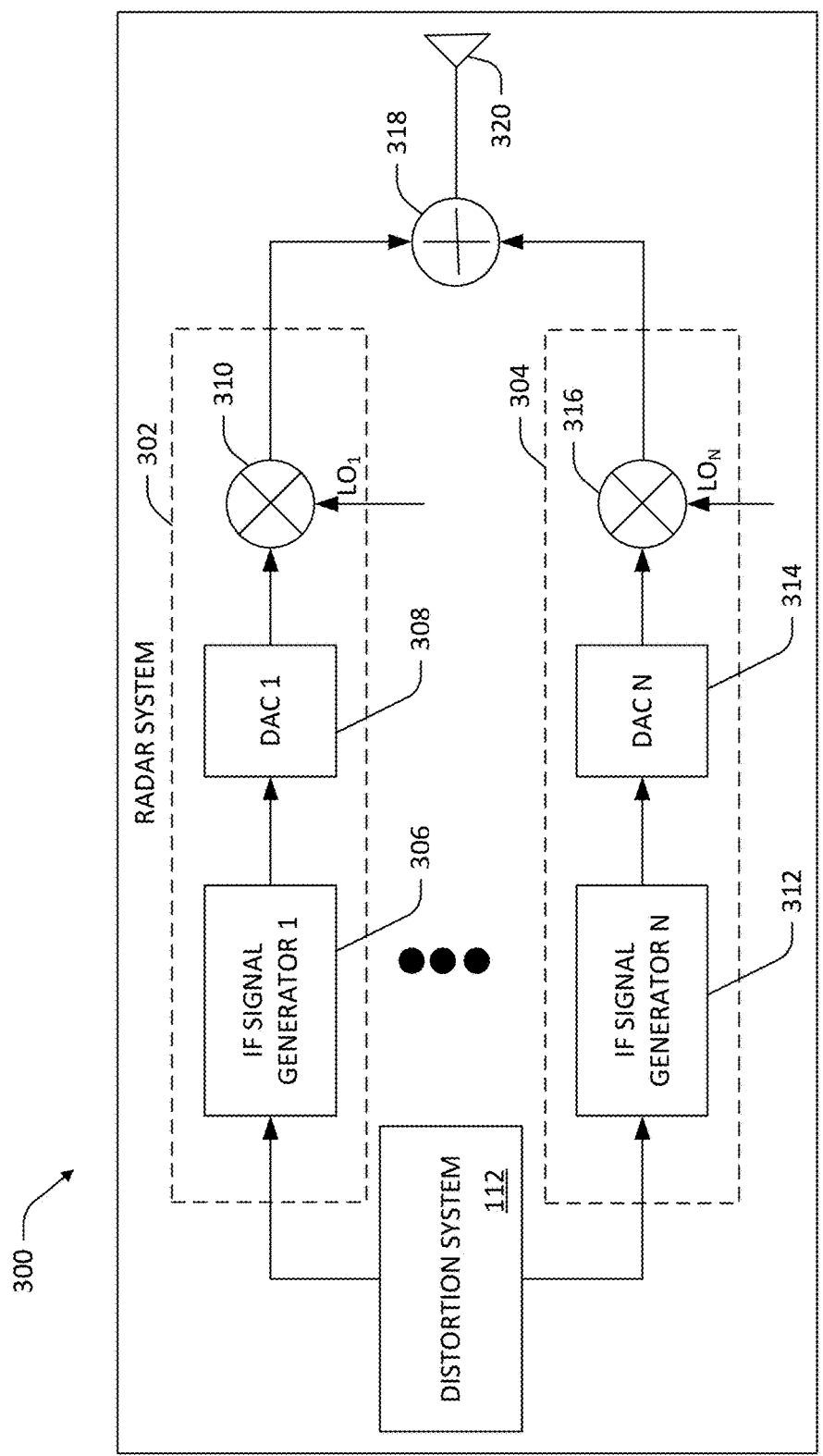
FIG. 3 is a functional block diagram of an example radar system, where digital intermediate frequency (IF) signals are distorted such that corresponding RF signals can be combined to form a very high IBW RF signal.

Referring now to FIG. 3, a functional block diagram of a radar system 300 is illustrated, where the distortion system 112 is configured to pre-distort digital signals generated by IF signal generators in transmit channels of the radar system 300. The radar system 300 includes a first transmit channel 302 through an Nth transmit channel 304. The first transmit channel 302 includes a first IF signal generator 306, a first DAC 308, and a first mixer 310. Similarly, the Nth transmit channel 304 includes an Nth IF signal generator 312, an Nth DAC 314, and an Nth mixer 316.

The radar system 300 also includes a combiner 318 that is configured to combine RF signals output from the transmit channels 302-304 to form a combined (very high IBW) RF signal. The radar system 300 also includes an antenna 320 that radiates the combined RF signal output by the combiner 318 into space. While the radar system 300 is depicted as including the combiner 318 and the antenna 320, in another embodiment, the radar system 300 may include multiple antennas (e.g., one antenna for each transmit channel). In such an embodiment, RF signals transmitted into space by the multiple antennas combine in space to form the combined RF signal. In yet another embodiment, the radar system 300 may include at least one combiner and several antennas.

As described previously, the mixers 310 and 316 in the transmit channels 302 and 304, respectively, mix analog IF signals output by the DACs 308 and 314 with LOs, thereby upconverting the analog IF signals to RF signals. With more specificity, the first mixer 310 mixes the RF signal output by the first DAC 308 with a first LO to generate a first analog RF signal. Likewise, the Nth mixer 316 mixes an Nth IF signal output by the Nth DAC 314 with an Nth LO to form an Nth RF signal. As noted previously, however, the LOs may leak across the transmit channels 302-304. Therefore, for instance, the Nth LO may leak into the first RF signal of the first transmit channel 302. The distortion system 112 is configured to pre-distort the digital signals output by the IF signal generators 306 and 312 to address LO leakages across the transmit channels 302-304. For instance, the distortion system 112 can shift the phase of the first IF digital signal generated by the first IF signal generator 306 and/or shift the phase of the Nth IF signal generated by the Nth IF signal generator 312 to address LO leakage across the transmit channels 302-304 of the radar system 300. More specifically, the distortion system 112 can shift the phase of each digital IF signal generated by each of the IF signal generators 306 and 312 to minimize overall LO leakage across the transmit channels 302-304. An amount of phase shift for each channel can be determined based upon an overall LO leakage measured at the output of the radar system 300.

FIGS. 4, 6, 9, and 12 illustrate exemplary methodologies relating to forming a very high IBW RF signal for transmission by a radar system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Figure 4:
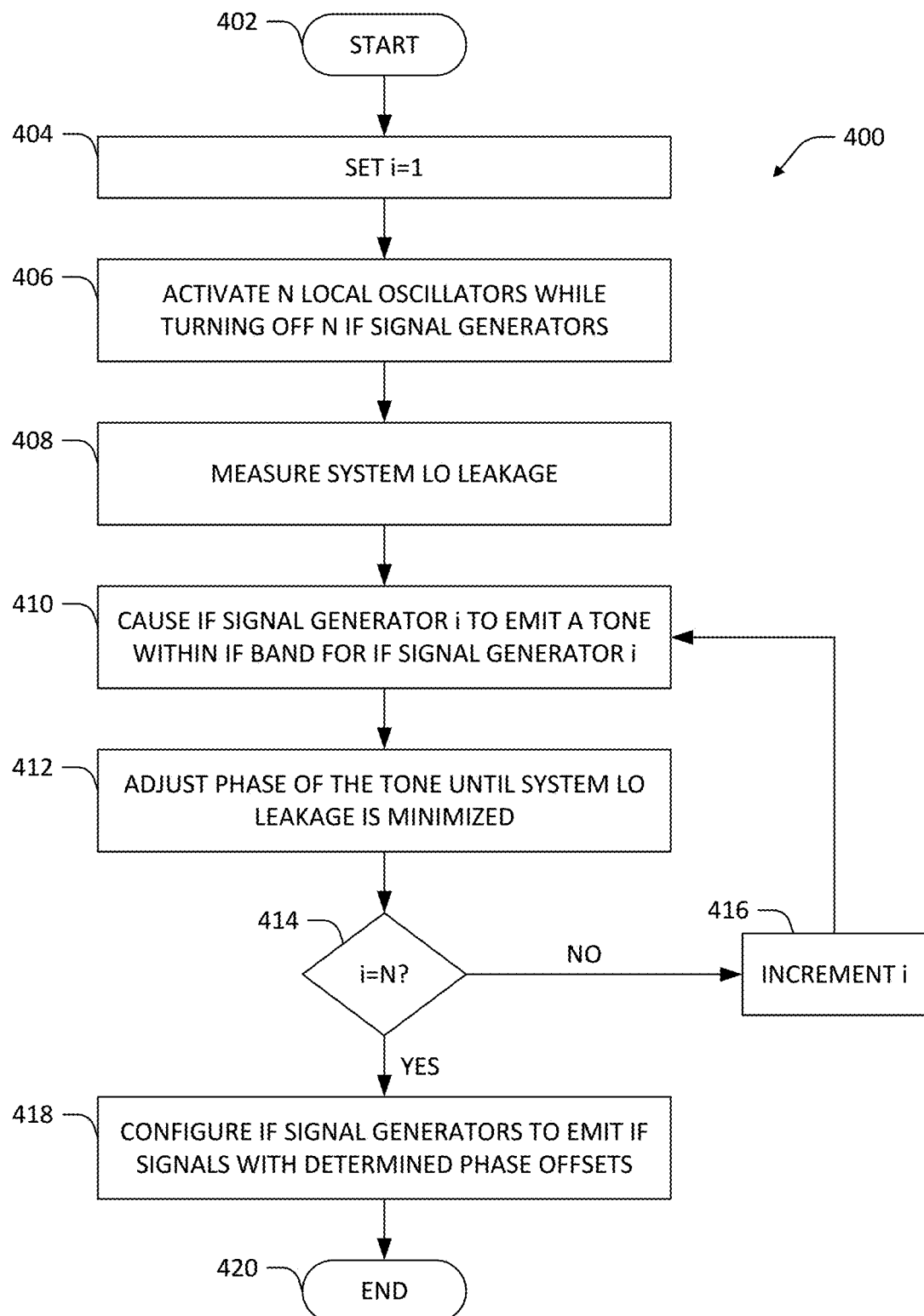
FIG. 4 is a flow diagram that depicts an example methodology for pre-distorting digital signals in connection with generating a combined very high IBW RF signal for transmission by a radar system.

Now referring solely to FIG. 4, an example methodology 400 for pre-distorting digital IF signals generated by IF signal generators in various transmit channels of a radar system (e.g., the radar system 300) in connection with correcting LO leakage across transmit channels is illustrated. The methodology 400 starts at 402, and at 404, a variable i is set to one. At 406, the N LOs of the radar system 300 are activated, while the N IF signal generators 306 and 312 are deactivated (turned off). Therefore, the output of the combiner 318 is the system LO leakage $L(\omega)$.

At 408, $L(\omega)$ is measured throughout the system. At 410, the ith IF signal generator is activated and caused to emit a single tone $S_1(\omega)$ with a constant amplitude (and frequency) within the IF frequency band for the ith IF signal generator.

Therefore, the mixer in the ith transmit channel receives the ith LO and $S_1(\omega)$ and upconverts $S_1(\omega)$ to RF based upon the ith LO; during such process, remaining IF signal generators in the radar system 300 remain deactivated. At 412, the phase of $S_1(\omega)$ is adjusted until $L(\omega)$ is minimized. Thereafter, the ith IF signal generator is turned off.

At 414, a determination is made as to whether i equals N. If it is determined at 414 that i does not equal N, then at 416, i is incremented, and the methodology returns to 410, where the ith IF signal generator is activated and caused to emit a tone within its frequency band. When it is determined at 414 that i equals N (and therefore phase shifts for all IF signal generators 306 and 312 in the radar system 300 have been computed), the methodology 400 proceeds to 418, where the IF signal generators are configured to emit digital IF signals with the phase shifts determined for the IF signal generators. The methodology 400 completes at 420.

Figure 5:
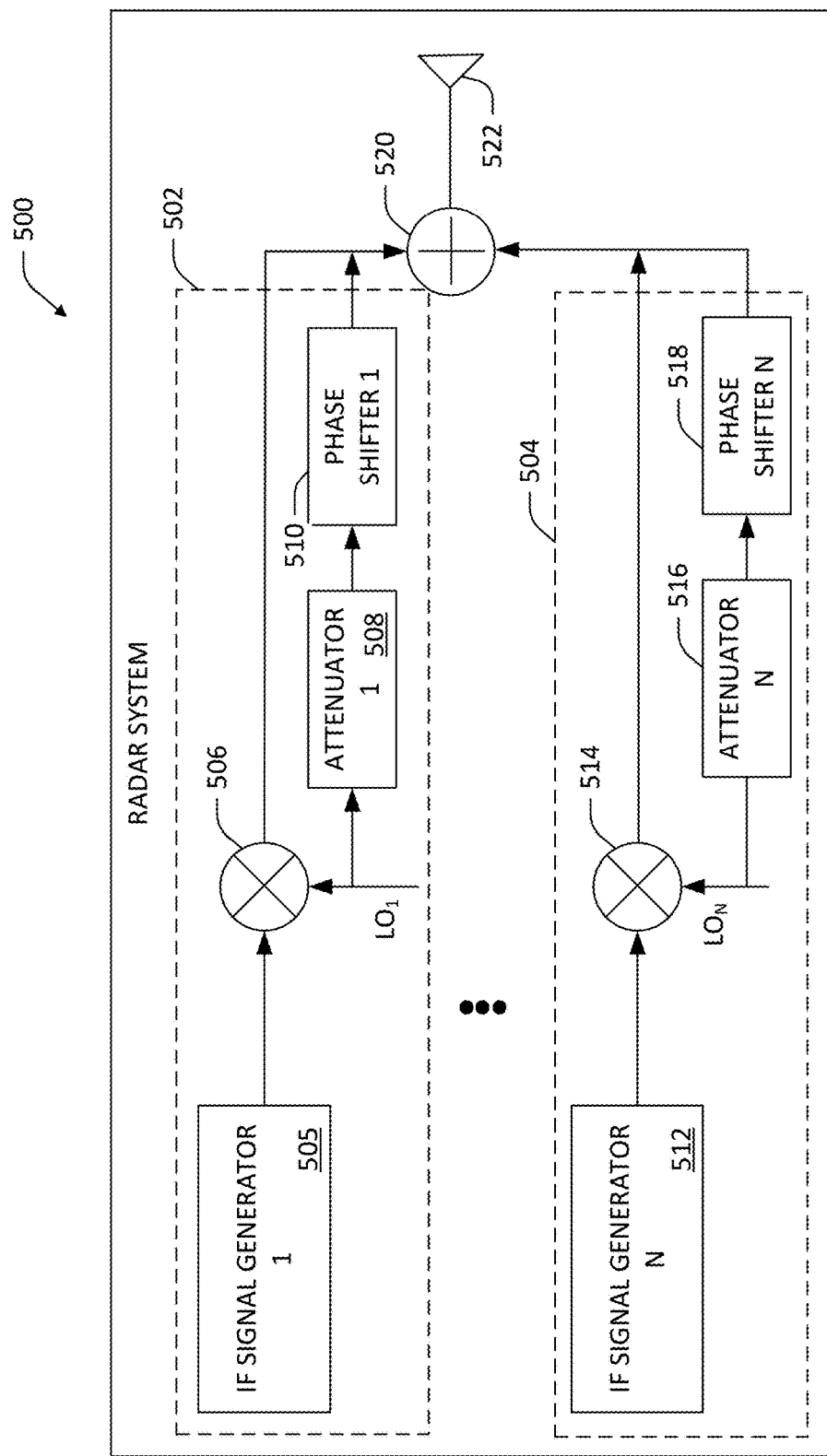
FIG. 5 is a functional block diagram of an example radar system where local oscillators (LOs) in several transmit channels are fed forward to address LO leakage, such that multiple RF signals can be combined to form a very high IBW RF signal.

With reference now to FIG. 5, a functional block diagram of an example radar system 500 is depicted, where the radar system 500 includes feedforward loops such that LOs of the transmit channels of the radar system 500 are fed forward, attenuated, and shifted in phase in order to address LO leakage across transmit channels of the radar system 500. The radar system 500 includes N transmit channels 502-504. The first transmit channel 502 includes a first IF signal generator 505, a first mixer 506, and a first feedforward loop, where the first feedforward loop includes a first attenuator 508 and a first phase shifter 510. It is to be understood that the first feedforward loop may include multiple attenuators and/or multiple phase shifters. The Nth transmit channel 504 includes an Nth IF signal generator 512, an Nth mixer 514, and an Nth feedforward loop, where the Nth feedforward loop includes an Nth attenuator 516 and an Nth phase shifter 518. In the radar system 500, the LOs are fed forward by way of the aforementioned feedforward loops, attenuated, and phase shifted to address LO leakage across the transmit channels 502-504 of the radar system 500. The radar system 500 additionally includes a combiner 520 and an antenna 522, where the combiner 520 combines the analog signals output by the mixers 506 and 514 and the fed forward, attenuated, and phase-shifted LOs to form a combined (very high IBW) RF signal, which is then transmitted into space by the antenna 522. While not illustrated, the radar system 500 may further include or be in communication with a temperature sensor, and the fed forward LOs can be attenuated and phase-shifted based upon a temperature reading output by the temperature sensor. Other environmental conditions can also be detected, such as air pressure, humidity, etc., and the fed forward LOs can be attenuated and phase shifted based upon the detected environmental conditions.

As will be described below with respect to FIG. 6, an amount of attenuation and phase shifting performed on each of the fed forward LOs is based upon overall system leakage $L(\omega)$ as well as leakage associated with individual feedforward loops $L_{LOOP}(\omega)$.

Figure 6:
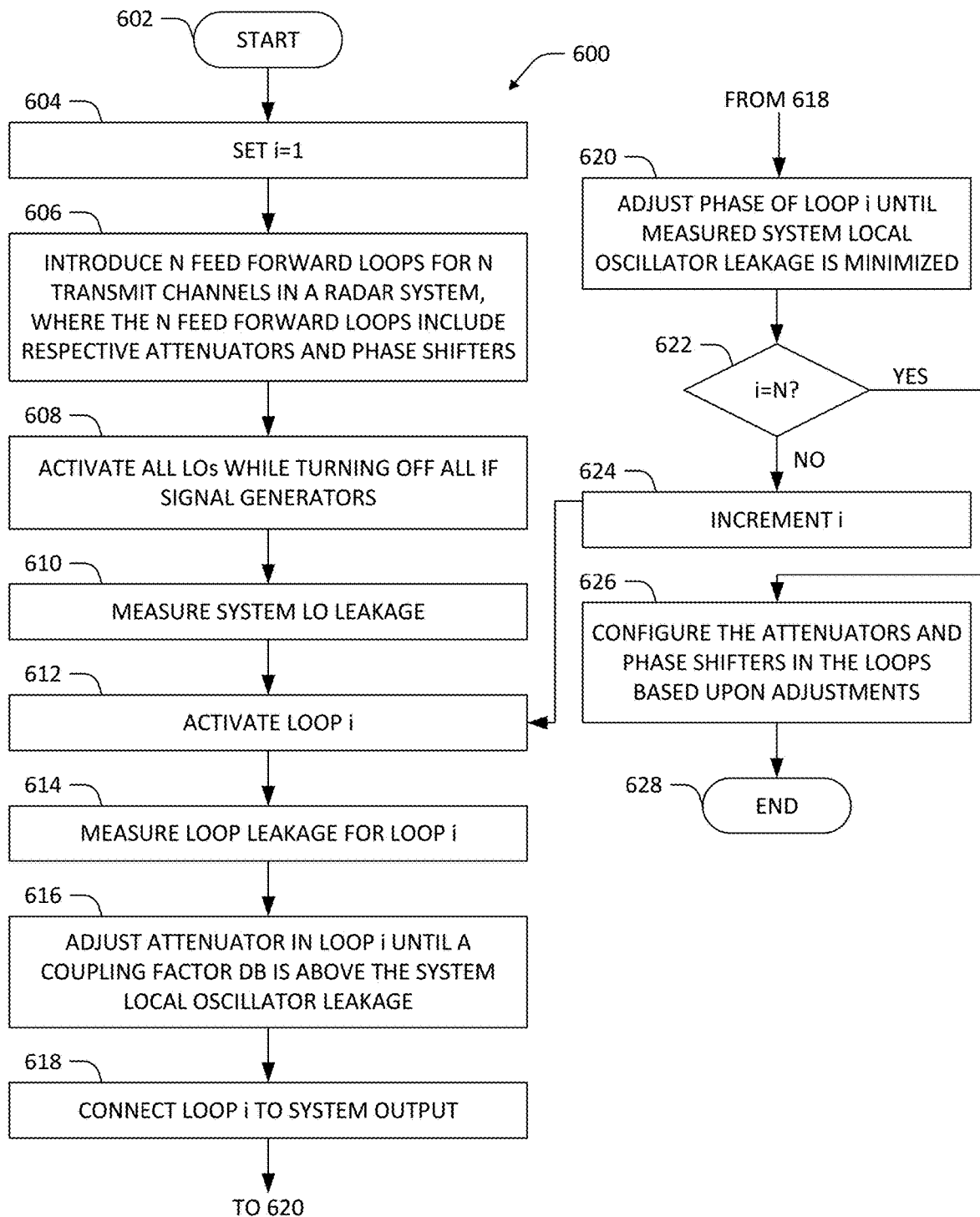
FIG. 6 is a flow diagram illustrating an example methodology for configuring a radar system to combine multiple RF signals to form a very high IBW signal for emission by the radar system.

Now referring to FIG. 6, a flow diagram illustrating an example methodology 600 for configuring the attenuators and phase shifters of the feedforward loops in the radar system 500 to address LO leakage across the transmit channels 502-504 of the radar system 500 is illustrated. The methodology 600 starts at 602, and at 604, a variable i is set to 1. At 606, N feedforward loops are introduced in the N transmit channels 502-504 of the radar system 500, where the N feedforward loops respectively feed the N LOs forward, and further where the N feedforward loops include respective attenuators and phase shifters. Put differently, each feedforward loop includes at least one attenuator and at least one phase shifter.

At 608, all LOs of the radar system 500 are activated while all of the IF signal generators (505 and 512) are turned off in the radar system 500.

At 610, system LO leakage $L(\omega)$ is measured, as described previously. At 612, loop i is activated, such that LO i is fed forward (through the attenuators and phase shifters).

At 614, loop leakage $L_{LOOP_i}(\omega)$ for loop i is measured. At 616, the at least one attenuator in loop i is adjusted until the amplitude of the signal output by the attenuator is a coupling factor (in decibels) above the system LO leakage $L(\omega)$. At 618, loop i is connected to the system output.

At 620, the phase shifters in the feedforward loop i are adjusted until the system LO leakage $L(\omega)$ is minimized. Effectively, the amplitude and phase of the fed forward LO are configured to cancel the portion of the system LO leakage associated with such LO.

At 622, a determination is made as to whether i equals N. If i does not equal N, then at 624 i is incremented, and the methodology returns to 612 where loop i is activated (and the previous loop i is deactivated). When, at 622, i equals N (and thus all of the transmit channels 502-504 have been addressed), the methodology 600 proceeds to 626, where the attenuators and phase shifters in the loops are configured based upon the adjustments performed at 616 and 620 for the attenuators and phase shifters. The loops are then all connected to the system output and the radar system 500 is operated. The methodology 600 completes at 628.

From the foregoing it can be ascertained that both the methodology 400 and the methodology 600 can be employed to distort signals in a radar system to address LO leakage across transmit channels of the radar system. This allows for the radar system to transmit a combined RF signal that has a relatively constant or other desired amplitude (and phase) across frequencies of the combined RF signal.

Figure 7:
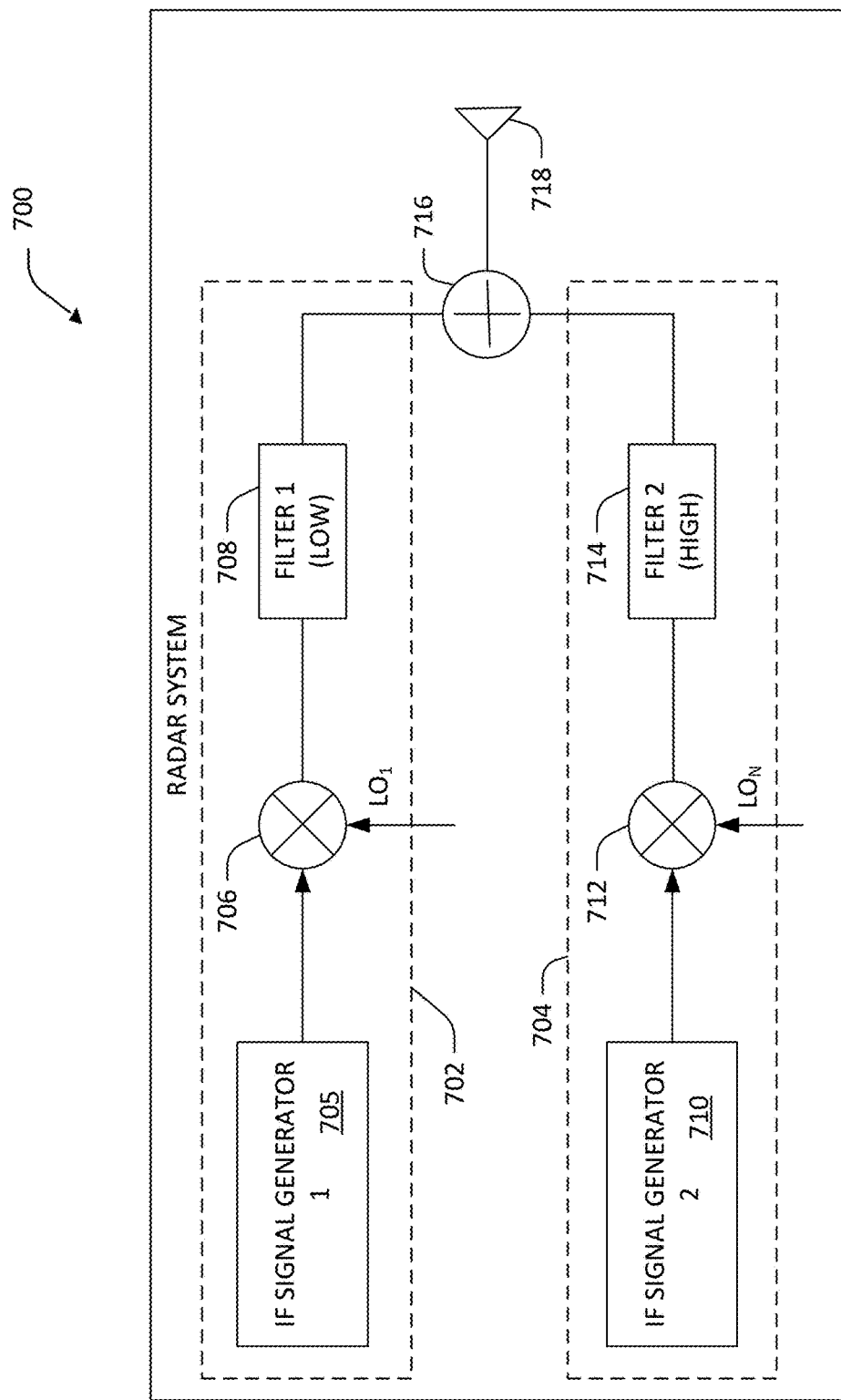
FIG. 7 is a functional block diagram of an example radar system that is configured to combine multiple RF signals to generate a very high IBW RF signal for transmission by the radar system.

Now referring to FIG. 7, a functional block diagram of a radar system 700 is illustrated, where LOs are selected to prevent leakage of LOs across transmit channels of the radar system 700. The radar system 700 includes two transmit channels: a first transmit channel 702 and a second transmit channel 704. The first transmit channel 702 includes a first IF signal generator 705, a first mixer 706, and a first filter 708, where, as described below, the first filter 708 is configured to filter a lower frequency image signal associated with upconversion of an IF signal to an RF signal. The second transmit channel 704 includes a second IF signal generator 710, a second mixer 712, and a second filter 714, where, as described below, the second filter 714 is configured to filter a higher frequency image signal associated with upconversion of an IF signal to an RF signal. The radar system 700 further includes a combiner 716 that combines outputs of the first and second transmit channels 702 and 704 to form a combined RF signal. The radar system 700 also includes an antenna 718 that radiates the combined RF signal into space. In another embodiment, the radar system 700 may include two antennas and may fail to include the combiner 716. In alternative embodiments, the radar system 700 can include bandpass filters for more than 2 channels, or as replacements for low/high pass filters 708 and 714. In yet another example, a wideband bandpass filter can be positioned after the combiner 716 to filter undesired images.

Figure 8:
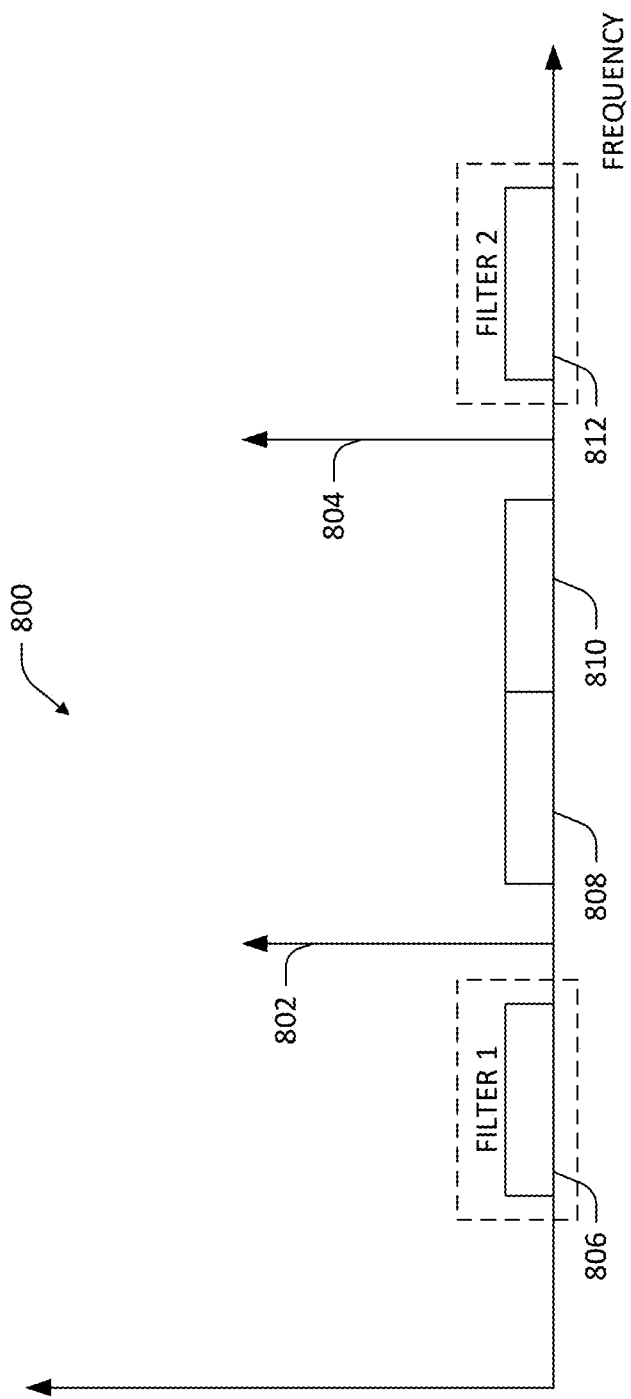
FIG. 8 is a schematic that depicts filtering of RF signals in connection with forming a combined very high IBW RF signal.

Referring briefly to FIG. 8, a schematic 800 that illustrates operation of the mixers 706 and 712 and the filters 708 and 714 is depicted. The schematic 800 depicts the first LO 802 and the second LO 804 in the frequency domain. When upconverting a first IF signal using the first LO 802, the first mixer 706 generates a first RF signal 806 in a first frequency band and a second RF signal 808 in a second frequency band, where the signals 806 and 808 are mirror images of one another in frequency about the first LO 802. Similarly, when the second mixer 712 upconverts a second IF signal using the second LO 804, the second mixer 712 generates a third RF signal 810 in a third frequency band and a fourth RF signal 812 in a fourth frequency band, where the third RF signal 810 and the fourth RF signal 812 are mirror images of one another in frequency about the second LO 804. In the radar system 700, frequencies of the first LO 802 and the second LO 804 can be selected such that a higher frequency RF signal output by the first mixer 706 (e.g., the second signal 808) and a lower frequency signal output by the second mixer 712 (e.g., the third RF signal 810) have adjacent frequency bands. The first filter 708 can filter the lower frequency RF signal output by the first mixer 706 (e.g., the first RF signal 806) and the second filter 714 can filter the higher RF frequency signal output by the second mixer 712 (e.g., the fourth RF signal 812). The schematic 800 illustrates that the first LO 802 and the second LO 804 have frequencies that are outside of the frequency band of the combined RF signal output by the combiner 716. Hence, the first LO 802 and the second LO 804 are selected to prevent LO leakage from the second transmit channel 704 from impacting the first RF signal output from the first transmit channel 702 and vice versa.

Figure 9:
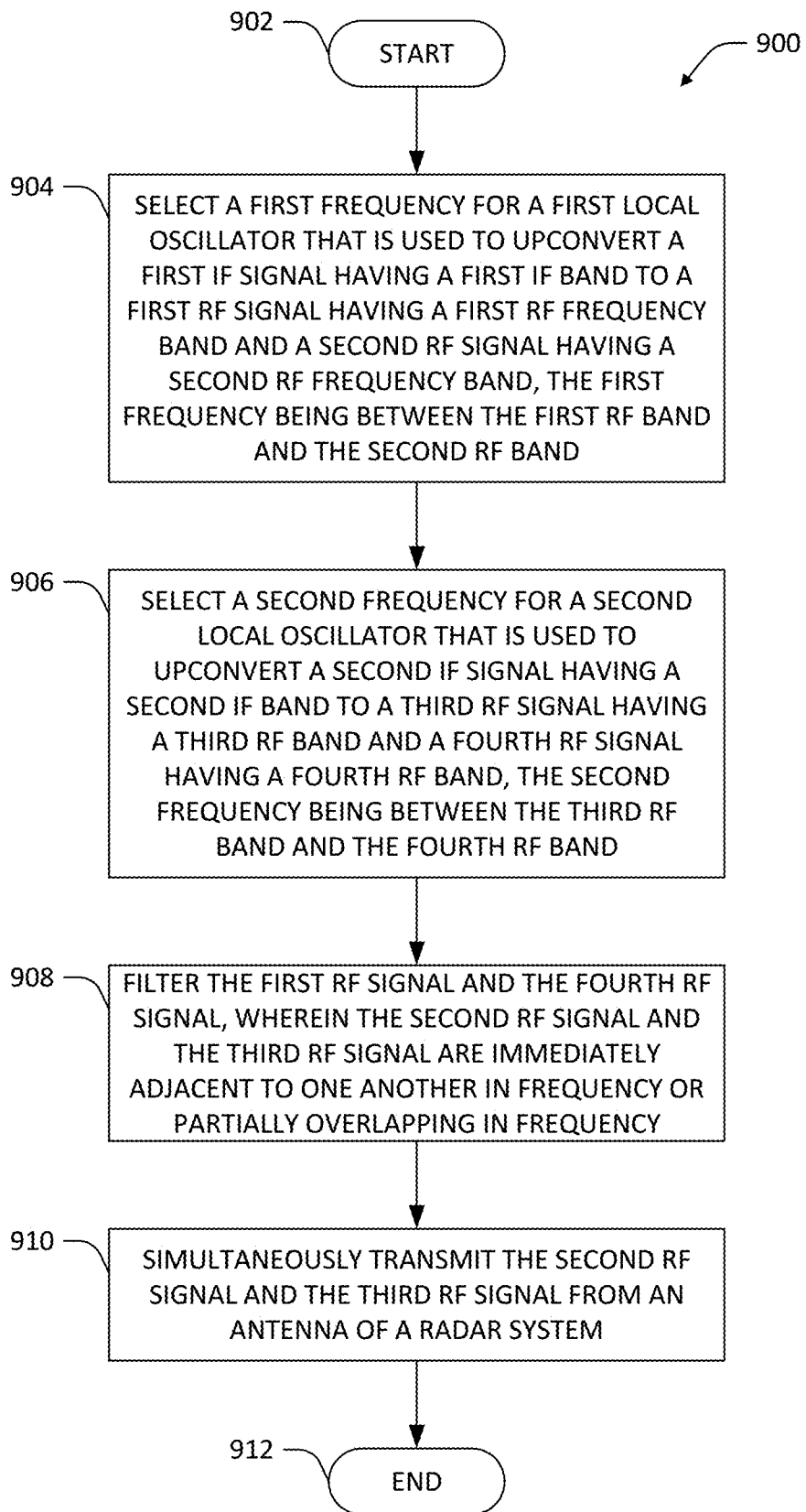
FIG. 9 is a flow diagram illustrating an example methodology for combining multiple RF signals to generate a very high IBW RF signal for transmission by a radar system.

Turning now to FIG. 9, a flow diagram illustrating a methodology 900 for combining RF signals output by two transmit channels of a radar system to form a combined (very high IBW) RF signal is illustrated. The methodology 900 starts at 902, and at 904, a first frequency for a first LO is selected, where the first LO is used to upconvert a first IF signal having a first IF band to a first RF signal having a first RF band and a second RF signal having a second RF band. The first frequency of the first LO is between the first RF frequency band of the first RF signal and the second RF frequency band of the second RF signal.

At 906, a second frequency is selected for a second LO, where the second LO is used to upconvert a second IF signal having a second IF band to a third RF signal having a third RF band and a fourth RF signal having a fourth RF band. The second frequency is between the third RF band and the fourth RF band. The first and second LOs are selected such that the first LO does not leak into the third RF signal and the second LO does not leak into the second RF signal.

At 908, the first RF signal is filtered and the fourth RF signal is filtered, where the second RF signal and the third RF signal are immediately adjacent to one another in frequency or are partially overlapping in frequency. At 910, the second RF signal and the third RF signal are combined to form a very high IBW RF signal, and an antenna of a radar system radiates the very high IBW RF signal into space. The methodology 900 completes at 912.

Figure 10:
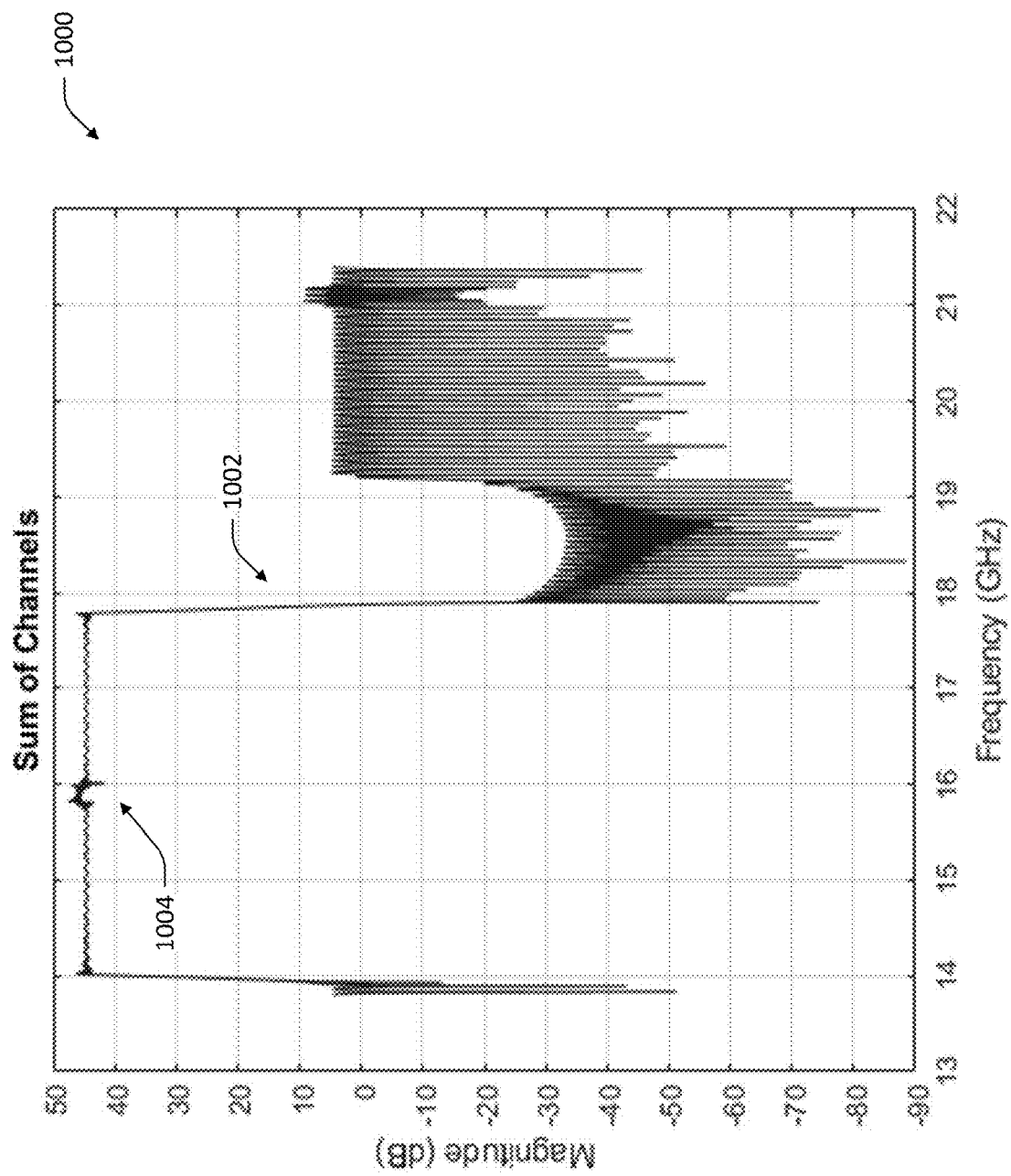
FIG. 10 is a plot that depicts a wideband signal output by a radar system.

Referring now to FIG. 10, a plot 1000 depicting an output (wideband) signal 1002 that is based upon signals output by multiple Tx channels is illustrated. The output signal 1002, in the example shown in FIG. 10, is based upon two signals, each having 2 GHz of bandwidth, that overlap by over 0.2 GHz. This results in "blip" in the overlapping region, identified by reference numeral 1004.

Figure 11:
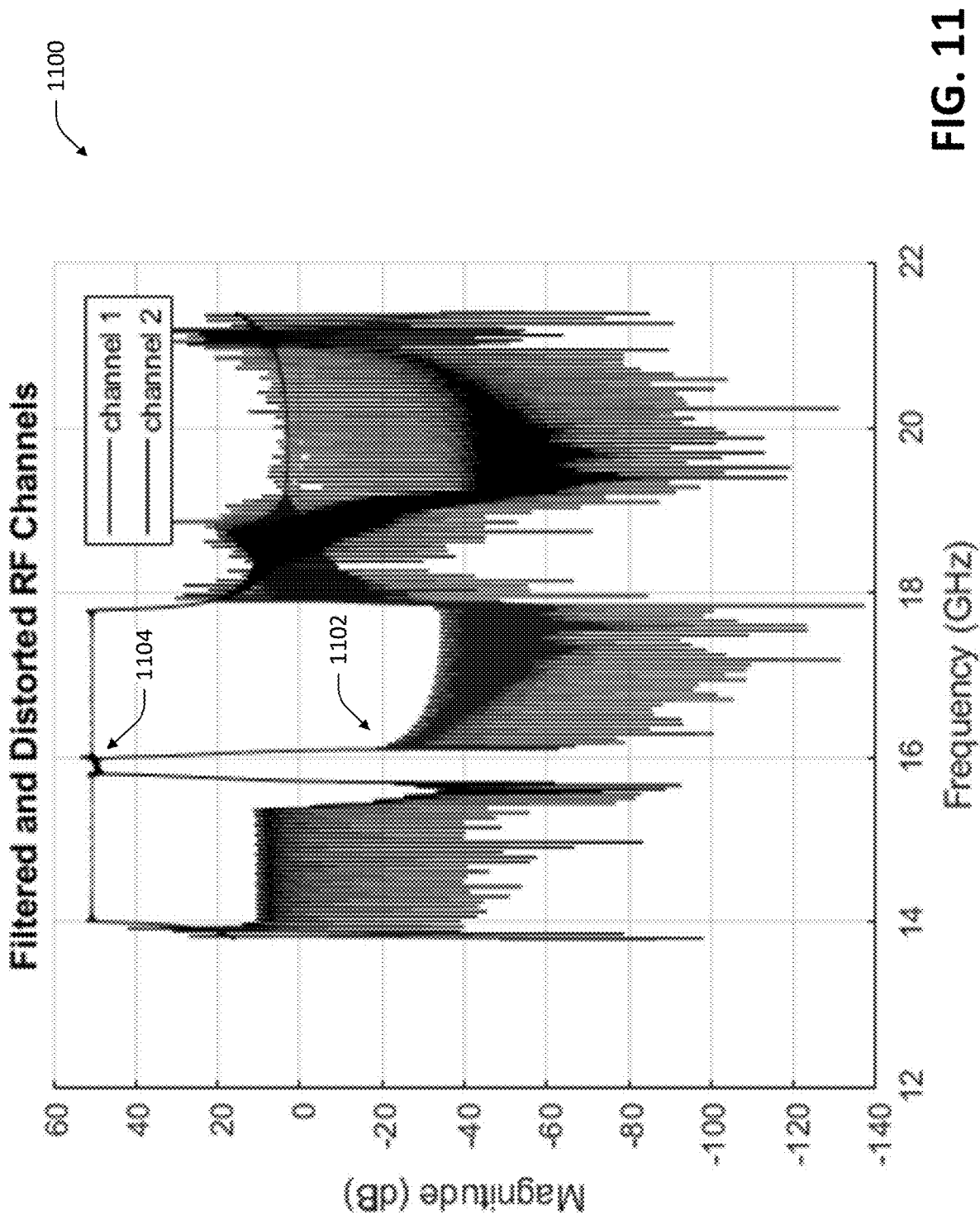
FIG. 11 is a plot that depicts a correction signal provided to digital signal generators to correct for non-uniformity across a pulse.

The distortion system 112 measures the wideband signal 1002 and computes a correction signal (in IF) based upon the measured wideband signal 1002 and an ideal (desired) waveform. The distortion system provides the correction signal to the digital signal generators in the Tx channels 102-104 of the radar system 100, and the digital signal generators in the Tx channels 102-104 pre-distort their respective signals with the correction signal. FIG. 11 is a plot 1100 that illustrates the correction signal 1102 as output by two Tx channels, where the correction signal includes a "blip" 1104 that opposes the blip 1004 illustrated in FIG. 10. When combined, then, the output signal 110 has a desired amplitude and phase throughout the pulse. In an example, the desired amplitude may be relative constant. For instance, amplitude may vary from an ideal amplitude by less than 1 dB throughout the pulse. In another example, amplitude may vary from the ideal amplitude by less than 2 dB throughout the pulse. In still yet another example, amplitude may vary from the ideal amplitude by less than 3 dB throughout the pulse.

Figure 12:
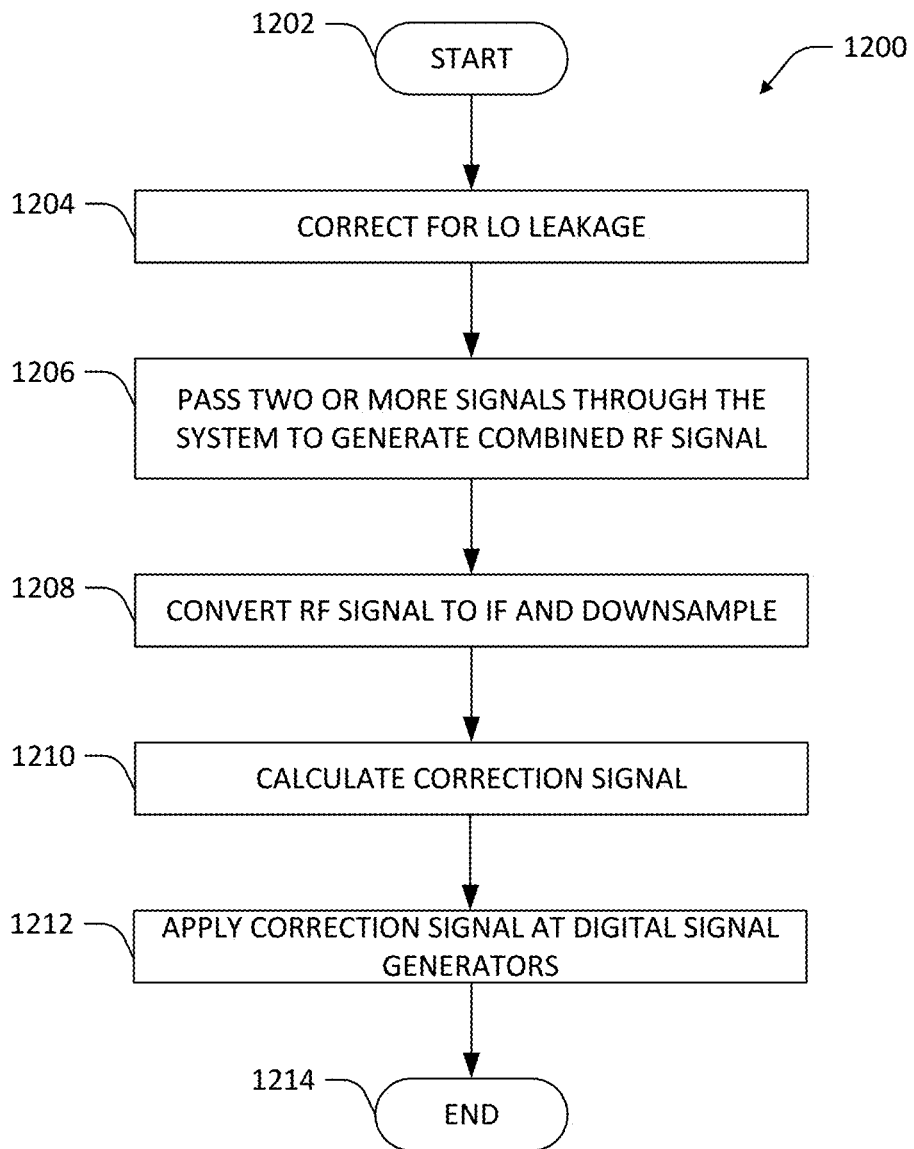
FIG. 12 is a flow diagram illustrating an example methodology for pre-distorting signals transmitted by digital signal processors.

Now referring to FIG. 12, a flow diagram 1200 illustrating an example methodology 1200 for pre-distorting signals emitted by transmit channels in a radar system is depicted. The methodology 1200 starts at 1202, and at 1204, LO leakage is accounted for by way of any of the approaches described herein. At 1206, two or more signals (with LO leakage corrected) are passed through the system to generate a combined RF signal. When frequency bands of the two or more signals overlap, the combined RF signal may include a region with amplitude that is not uniform with respect to the remainder of the combined RF signal.

At 1208, the combined RF signal is converted to IF and downsampled. At 1210, a correction signal is calculated based upon the downsampled IF signal and an ideal signal that is to be output by the radar system. More specifically, and in an example, the correction signal is computed by way of the following algorithm:

$$C(\omega) = \frac{\text{Ideal}(\omega) - B \times L(\omega)}{G(\omega) - B \times L(\omega)}, \quad \text{(Eq. 4)}$$

where $C(\omega)$ is the correction signal, $\text{Ideal}(\omega)$ is the ideal signal in IF, B is an amplitude correction factor, $L(\omega)$ is the leakage signal, and $G(\omega)$ is the observed signal in IF.

At 1212, the correction signal is provided to the digital signal generators in the Tx channels, resulting in the digital signal generators pre-distorting the signals output thereby. The methodology 1200 completes at 1214.

Figure 13:
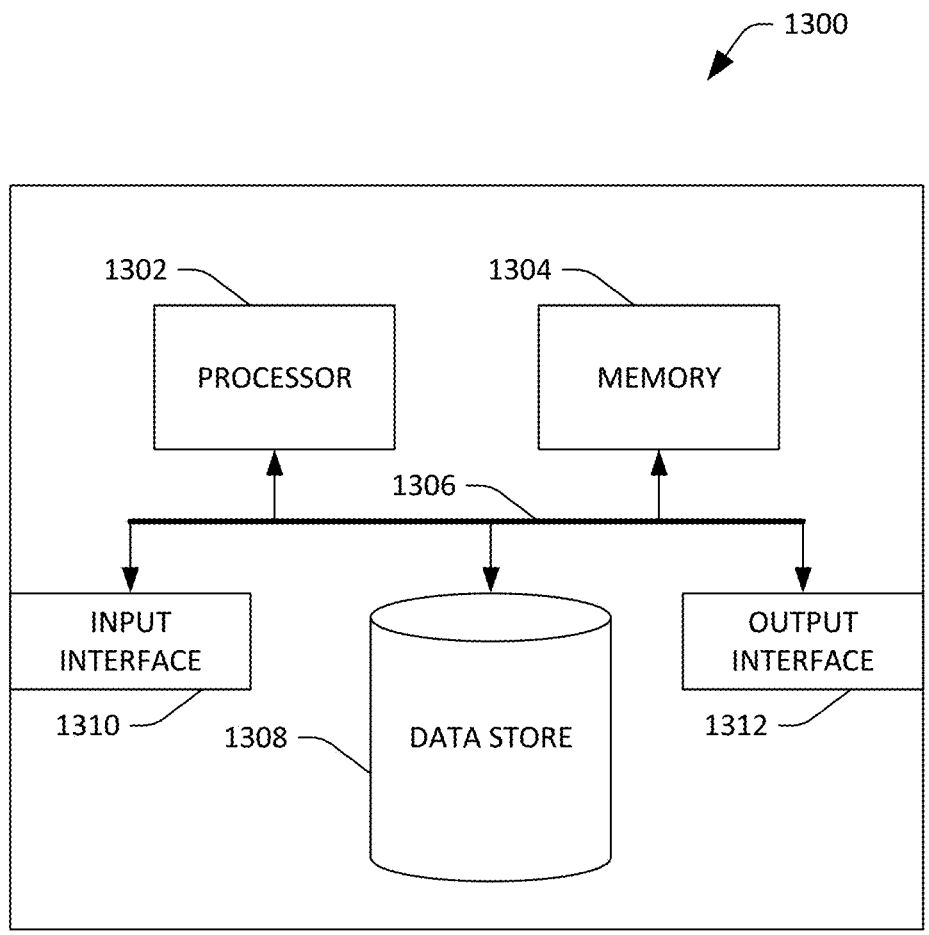
FIG. 13 is an example computing device.

Referring now to FIG. 13, a high-level illustration of an exemplary computing device 1300 that can be used in accordance with the systems and methodologies disclosed herein is illustrated. For instance, the computing device 1300 may be or may be included in digital signal processor (DSP) of a radar system. By way of another example, the computing device 1300 can be used in a system that generates data based upon echo signals detected by a radar system. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store phase shift values, attenuation values, etc.

The computing device 1300 additionally includes a data store 1308 that is accessible by the processor 1302 by way of the system bus 1306. The data store 1308 may include executable instructions, phase shift values, values indicative of echo returns, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc., by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Examples pertaining to a radar system that is configured to generate a radar signal with very high IBW are set forth below.

(A1) According to one aspect, in one or more embodiments, a radar system is configured to emit a very high IBW radar signal, where the radar signal has a frequency band. The radar system includes a first transmit channel, where the first transmit channel includes a first mixer that outputs a first RF signal having a first RF band based upon a first LO and a first digital signal generated by at least one digital signal generator. The radar system also includes a second transmit channel, where the second transmit channel comprises a second mixer that outputs a second analog RF signal having a second RF band, where the second analog RF signal is output by the second mixer based upon a second LO and a second digital signal generated by the at least one digital signal generator. The at least one digital signal generator controls the amplitudes and shifts phases of the first digital signal and the second digital signal based upon a computed system LO leakage, where the amplitudes and phases of the first digital signal and the second digital signal are shifted to address leakage of the first LO and the second LO across transmit channels of the radar system. Additionally, the radar signal is based upon the first analog RF signal and the second analog RF signal, where the frequency band of the radar signal includes the first RF band and the second RF band.

(A2) In one or more embodiments of the radar system of A1, the at least one digital signal generator includes a first digital signal generator and a second digital signal generator, the first transmit channel includes the first digital signal generator and the second transmit channel includes the second digital signal generator, and further where the first digital signal generator generates the first digital signal and the second digital signal generator generates the second digital signal.

(A3) In one or more embodiments of the radar system of A2, the computed system LO leakage is computed by a processor, where the processor is configured to perform acts that include causing the first digital signal generator and/or the second digital signal generator to be deactivated and causing the first LO to be directed to the first mixer. The acts also include causing the second LO to be directed to the second mixer, wherein output of the first transmit channel and the second transmit channel are combined while the first digital signal generator and/or the second digital signal generator are deactivated and further while the first LO is directed to the first mixer and the second LO is directed to the second mixer. The acts additionally include measuring the combined output of the first transmit channel and the second transmit channel.

(A4) In one or more embodiments of the radar system of at least one of A1-A3, the radar system is a SAR system that is coupled to an aerial vehicle.

(A5) In one or more embodiments of the radar system of at least one of A1-A4, the first RF band and the second RF band partially overlap, where the at least one digital signal generator generates the first digital signal and the second digital signal based upon a computed correction signal, and further where the computed correction signal is configured to address variance in magnitude in the radar signal where the first RF band and the second RF band partially overlap.

(A6) In one or more embodiments of the radar system of at least one of A1-A5, the first transmit channel includes a first antenna that is operably coupled to the first mixer, the second transmit channel includes a second antenna that is operably coupled to the second mixer, where the first antenna radiates the first analog RF signal and the second antenna radiates the second analog RF signal to form the radar signal.

(A7) In one or more embodiments of the radar system of at least one of A1-A6, the radar system also includes a combiner that is operably coupled to the first mixer and the second mixer, wherein the combiner is configured to combine the first analog RF signal and the second analog RF signal to form the radar signal. The radar system further includes an antenna that is operably coupled to the combiner, wherein the antenna radiates the radar signal.

(A8) In one or more embodiments of the radar system of at least one of A1-A7, the first transmit channel further includes a first feedforward loop and the second transmit channel includes a second feedforward loop, wherein the radar signal is based upon output of the first feedforward loop and the second feedforward loop.

(A9) In one or more embodiments of the radar system of A8, the first feedforward loop includes a first attenuator and a first phase shifter, where the first LO is provided as input to the first feedforward loop, attenuated by the first attenuator, and phase-shifted by the first phase shifter, and further where output of the first feedforward loop is combined with the first RF signal. The second feedforward loop includes a second attenuator and a second phase shifter, where the second LO is provided as input to the second feedforward loop, attenuated by the second attenuator, and phase-shifted by the second phase shifter, and further where output of the second feedforward loop is combined with the second RF signal.

(A10) In one or more embodiments of the radar system of A9, a first amount of phase-shifting performed by the first phase-shifter and a second amount of phase-shifting performed by the second phase shifter is performed based upon the computed system LO leakage.

(B1) In another aspect, one or more embodiments include a radar system that is configured to emit a very high IBW radar signal. The radar system includes a first transmit channel that includes a first mixer, where the first mixer is configured to mix a first analog IF signal with a first LO to form a first analog RF signal. The first transmit channel also includes first feedforward loop that receives the first LO as input and outputs a first modified analog signal as output. The radar system also includes a second transmit channel that includes a second mixer, where the second mixer is configured to mix a second analog IF signal with a second LO to form a second analog RF signal. The second transmit channel also includes a second feedforward loop that receives the second LO as input and outputs a second modified analog signal as output. The first modified analog signal is configured to address first LO leakage in the first analog RF signal and the second modified analog signal is configured to address second LO leakage in the second analog RF signal. The radar signal is based upon the first analog RF signal, the first modified analog signal, the second analog RF signal, and the second modified analog signal.

(B2) In one or more embodiments of the radar system of B1, output of the first feedforward loop is combined with the first RF signal, and further wherein output of the second feedforward loop is combined with the second RF signal.

(B3) In one or more embodiments of the radar system of at least one of B1-B2, the first feedforward loop includes a first attenuator and a first phase shifter, wherein the first attenuator and the first phase shifter operate in conjunction to form the first modified analog signal. Further, the second feedforward loop includes a second attenuator and a second phase shifter, wherein the second attenuator and the second phase shifter operate in conjunction to form the second modified analog signal.

(B4) In one or more embodiments of the radar system of at least one of B1-B3, the radar system comprises N transmit channels, and further wherein each transmit channel comprises a respective feedforward loop.

(B5) In one or more embodiments of the radar system of at least one of B1-B4, the first transmit channel also includes a first digital signal generator that is configured to generate a first digital signal. The first transmit channel further includes a first DAC that is operably coupled to the first digital signal generator and generates the first analog IF signal based upon the first digital signal. The first digital signal generator controls amplitude and shifts a first phase of the first digital signal to address a computed system LO leakage of the radar system. The second transmit channel further includes a second digital signal generator that is configured to generate a second digital signal. The second transmit channel also includes a second DAC that is operably coupled to the second digital signal generator and generates the second analog IF signal based upon the second digital signal. The second digital signal generator controls amplitude and shifts a second phase of the second digital signal to address the computed system LO leakage of the radar system.

(B6) In one or more embodiments of the radar system of at least one of B1-B5, the first analog RF signal has a first frequency band, the second analog signal has a second frequency band, and a frequency band of the radar signal spans both the first frequency band and the second frequency band.

(B7) In one or more embodiments of the radar system of B6, the radar signal has a desired amplitude and phase across the frequency band of the radar signal.

(B8) In one or more embodiments of the radar system of B7, the radar system further includes a first digital signal generator that is configured to generate a first digital signal, the first digital signal has a first frequency band corresponding thereto. The radar system additionally includes a second digital signal generator that is configured to generate a second digital signal, the second digital signal has a second frequency band corresponding thereto. The first frequency band and the second frequency band partially overlap, where the first digital signal and the second digital signal are based upon a computed correction signal that is configured to account for amplitude variance where the first frequency band and the second frequency band overlap.

(C1) In yet another aspect, one or more embodiments include a radar system that is configured to emit a very high IBW radar signal. The radar system includes a first transmit channel, the first transmit channel includes a first digital signal generator that is configured to generate a first digital signal. The first transmit channel also includes a first DAC that is operably coupled to the first digital signal generator, the first DAC is configured to receive the first digital signal and generate a first analog signal based upon the first digital signal. The first transmit channel further includes a first mixer that is operably coupled to the first DAC, the first mixer is configured to receive the first analog signal and a first LO and generate a first analog RF signal based upon the first analog signal and the first LO, wherein the first analog RF signal has a first frequency band. The radar system also includes a second transmit channel, the second transmit channel includes a second digital signal generator that is configured to generate a second digital signal. The second transmit channel also includes a second DAC that is operably coupled to the second digital signal generator, the second DAC is configured to receive the second digital signal and generate a second analog signal based upon the second digital signal. The second transmit channel further includes a second mixer that is operably coupled to the second DAC, the second mixer is configured to receive the second analog signal and a second LO and generate a second RF signal based upon the second analog signal and the second LO, where the second RF signal has a second frequency band. The first LO and the second LO are selected such that first frequency band and the second frequency band are adjacent to one another or partially overlap with one another and the first LO does not leak into the second analog signal and the second LO does not leak into the first analog signal. Additionally, the radar signal is based upon the first analog RF signal and the second analog RF analog signal. Moreover, a frequency band of the radar signal includes the first frequency band of the first analog RF signal and the second frequency band of the second analog RF signal.

(C2) In one or more embodiments of the radar system of C1, the first digital signal generator and the second digital signal generator generate the first digital signal and the second digital signal, respectively, based upon a correction signal that is computed to account for variance in magnitude of the radar signal where the first RF signal and the second RF signal overlap such that the radar signal has a desired amplitude across the frequency band of the radar signal.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A radar system configured to emit a very high instantaneous bandwidth radar signal, where the radar signal has a frequency band, the radar system comprising:
   a first transmit channel, where the first transmit channel comprises a first mixer configured to output a first analog radio frequency (RF) signal having a first RF band based upon:
      a first local oscillator (LO) adapted to generate a LO first frequency; and
      a first digital signal generated by at least one digital signal generator; and
   a second transmit channel, where the second transmit channel comprises a second mixer that outputs a second analog RF signal having a second RF band based upon:
      a second LO adapted to generate a second LO frequency different from the first LO frequency; and
      a second digital signal generated by the at least one digital signal generator;
   wherein the at least one digital signal generator is adapted to control the amplitudes and shifts phases of the first digital signal and the second digital signal based upon a computed system LO leakage;
   wherein the amplitudes and phases of the first digital signal and the second digital signal are shifted to address leakage of the first LO and the second LO across transmit channels of the radar system;
   wherein the radar signal is based upon the first analog RF signal and the second analog RF signal, wherein the frequency band of the radar signal includes the first RF band and the second RF band;
   wherein the at least one digital signal generator includes a first digital signal generator and a second digital signal generator;
   wherein the first transmit channel includes the first digital signal generator and the second transmit channel includes the second digital signal generator;
   wherein the first digital signal generator is adapted to generate the first digital signal and the second digital signal generator is adapted to generate the second digital signal;
   wherein the computed system LO leakage is computed by a processor, wherein the processor is configured to perform acts comprising:
      causing the first digital signal generator or the second digital signal generator to be deactivated;
      causing the first LO to be directed to the first mixer;
      causing the second LO to be directed to the second mixer;
      combining outputs of the first transmit channel and the second transmit channel are combined while the first digital signal generator and/or the second digital signal generator are deactivated and further while the first LO is directed to the first mixer and the second LO is directed to the second mixer; and
      measuring the combined output of the first transmit channel and the second transmit channel.

2. The radar system of claim 1 being a synthetic aperture radar (SAR) system that is coupled to an aerial vehicle.

3. A radar system configured to emit a very high instantaneous bandwidth radar signal, where the radar signal has a frequency band, the radar system comprising:
   a first transmit channel, where the first transmit channel comprises a first mixer configured to output a first analog radio frequency (RF) signal having a first RF band based upon:
      a first local oscillator (LO) adapted to generate a LO first frequency; and
      a first digital signal generated by at least one digital signal generator; and
   a second transmit channel, where the second transmit channel comprises a second mixer that outputs a second analog RF signal having a second RF band based upon:
      a second LO adapted to generate a second LO frequency different from the first LO frequency; and
      a second digital signal generated by the at least one digital signal generator;
   wherein the at least one digital signal generator is adapted to control the amplitudes and shifts phases of the first digital signal and the second digital signal based upon a computed system LO leakage;
   wherein the amplitudes and phases of the first digital signal and the second digital signal are shifted to address leakage of the first LO and the second LO across transmit channels of the radar system;
   wherein the radar signal is based upon the first analog RF signal and the second analog RF signal, wherein the frequency band of the radar signal includes the first RF band and the second RF band;
   wherein the first RF band and the second RF band partially overlap;
   wherein the at least one digital signal generator is adapted to generate the first digital signal and the second digital signal based upon a computed correction signal; and
   wherein the computed correction signal is configured to address variance in magnitude in the radar signal where the first RF band and the second RF band partially overlap.

4. The radar system of claim 1,
wherein the first transmit channel includes a first antenna that is operably coupled to the first mixer;
wherein the second transmit channel includes a second antenna that is operably coupled to the second mixer; and
wherein the first antenna is adapted to radiate the first analog RF signal and the second antenna is adapted to radiate the second analog RF signal to form the radar signal.

5. The radar system of claim 1, further comprising:
a combiner that is operably coupled to the first mixer and the second mixer, wherein the combiner is adapted to combine the first analog RF signal and the second analog RF signal to form the radar signal; and
an antenna that is operably coupled to the combiner, wherein the antenna is adapted to radiate the radar signal.

6. A radar system configured to emit a very high instantaneous bandwidth radar signal, where the radar signal has a frequency band, the radar system comprising:
a first transmit channel, where the first transmit channel comprises a first feedforward loop, and a first mixer configured to output a first analog radio frequency (RF) signal having a first RF band based upon:
a first local oscillator (LO) adapted to generate a LO first frequency; and
a first digital signal generated by at least one digital signal generator; and
a second transmit channel, where the second transmit channel comprises a second feedforward loop, and a second mixer that outputs a second analog RF signal having a second RF band based upon:
a second LO adapted to generate a second LO frequency different from the first LO frequency; and
a second digital signal generated by the at least one digital signal generator;
wherein the at least one digital signal generator is adapted to control the amplitudes and shifts phases of the first digital signal and the second digital signal based upon a computed system LO leakage;
wherein the amplitudes and phases of the first digital signal and the second digital signal are shifted to address leakage of the first LO and the second LO across transmit channels of the radar system; and
wherein the radar signal is based upon an output of the first feedforward loop and an output of the second feedforward loop and upon the first analog RF signal and the second analog RF signal, the frequency band of the radar signal including the first RF band and the second RF band.

7. The radar system of claim 6,
wherein the first feedforward loop includes a first attenuator and a first phase shifter;
wherein the first LO is provided as input to the first feedforward loop, attenuated by the first attenuator, and phase-shifted by the first phase shifter;
further wherein the output of the first feedforward loop is combined with the first RF signal; and
wherein the second feedforward loop includes a second attenuator and a second phase shifter;
wherein the second LO is provided as input to the second feedforward loop, attenuated by the second attenuator, and phase-shifted by the second phase shifter;
further wherein the output of the second feedforward loop is combined with the second RF signal.

8. The radar system of claim 7, wherein a first amount of phase-shifting performed by the first phase-shifter and a second amount of phase-shifting performed by the second phase shifter is performed based upon the computed system LO leakage.

9. The radar system of claim 3 being a synthetic aperture radar (SAR) system that is coupled to an aerial vehicle.

10. The radar system of claim 6 being a synthetic aperture radar (SAR) system that is coupled to an aerial vehicle.

11. The radar system of claim 3,
wherein the first transmit channel includes a first antenna that is operably coupled to the first mixer;
wherein the second transmit channel includes a second antenna that is operably coupled to the second mixer; and
wherein the first antenna is adapted to radiate the first analog RF signal and the second antenna is adapted to radiate the second analog RF signal to form the radar signal.

12. The radar system of claim 6,
wherein the first transmit channel includes a first antenna that is operably coupled to the first mixer;
wherein the second transmit channel includes a second antenna that is operably coupled to the second mixer; and
wherein the first antenna is adapted to radiate the first analog RF signal and the second antenna is adapted to radiate the second analog RF signal to form the radar signal.

13. The radar system of claim 3, further comprising:
a combiner that is operably coupled to the first mixer and the second mixer, wherein the combiner is adapted to combine the first analog RF signal and the second analog RF signal to form the radar signal; and
an antenna that is operably coupled to the combiner, wherein the antenna is adapted to radiate the radar signal.

14. The radar system of claim 6, further comprising:
a combiner that is operably coupled to the first mixer and the second mixer, wherein the combiner is adapted to combine the first analog RF signal and the second analog RF signal to form the radar signal; and
an antenna that is operably coupled to the combiner, wherein the antenna is adapted to radiate the radar signal.

* * * * *